United States Patent [19]
Westmore

[11] Patent Number: 5,161,153
[45] Date of Patent: * Nov. 3, 1992

[54] SYNCHRONOUS NETWORK

[75] Inventor: Richard J. Westmore, Willingham, Great Britain

[73] Assignee: STC PLC, London, England

[*] Notice: The portion of the term of this patent subsequent to Sep. 18, 2007 has been disclaimed.

[21] Appl. No.: 594,388

[22] Filed: Oct. 5, 1990

[51] Int. Cl.⁵ .......................................... H04L 12/56
[52] U.S. Cl. ................................................... 370/94.3
[58] Field of Search .................... 370/3, 94.1, 94.3, 4; 379/221

[56]  References Cited

U.S. PATENT DOCUMENTS

| | | | |
|---|---|---|---|
| 4,347,498 | 9/1982 | Lee et al. | 370/94.1 |
| 4,715,027 | 12/1987 | Mahapatra et al. | 370/3 |
| 4,745,592 | 5/1988 | Gabriagues | 370/3 |
| 4,839,887 | 6/1989 | Yano | 370/94.1 |
| 4,957,340 | 9/1990 | Kirklay | 370/3 |
| 4,972,463 | 11/1990 | Danielson et al. | 370/3 |

FOREIGN PATENT DOCUMENTS

88/05233  7/1988  PCT Int'l Appl. .
88/09093  11/1988  PCT Int'l Appl. .

OTHER PUBLICATIONS

Ballart and Ching, "SONET: Now It
Wagner and Kobrinski,

*Primary Examiner*—Douglas W. Olms
*Assistant Examiner*—T. Samuel
*Attorney, Agent, or Firm*—Lee, Mann, Smith, McWilliams, Sweeney & Ohlson

[57]  ABSTRACT

A broadcast facility is provided in a synchronous network comprising a number of nodes (b 201) coupled via a star coupler (b 211). Data is transmitted via the network in a sequence of frames. Each node with a public write to send transmits it to all system nodes (including itself) in the next available frame. Each node has its own identifying characteristic, e.g. a unique assigned frequency. These identifying characteristics determine the notional order in which data packets within a frame are received thus providing each frame with a timestamp.

6 Claims, 4 Drawing Sheets

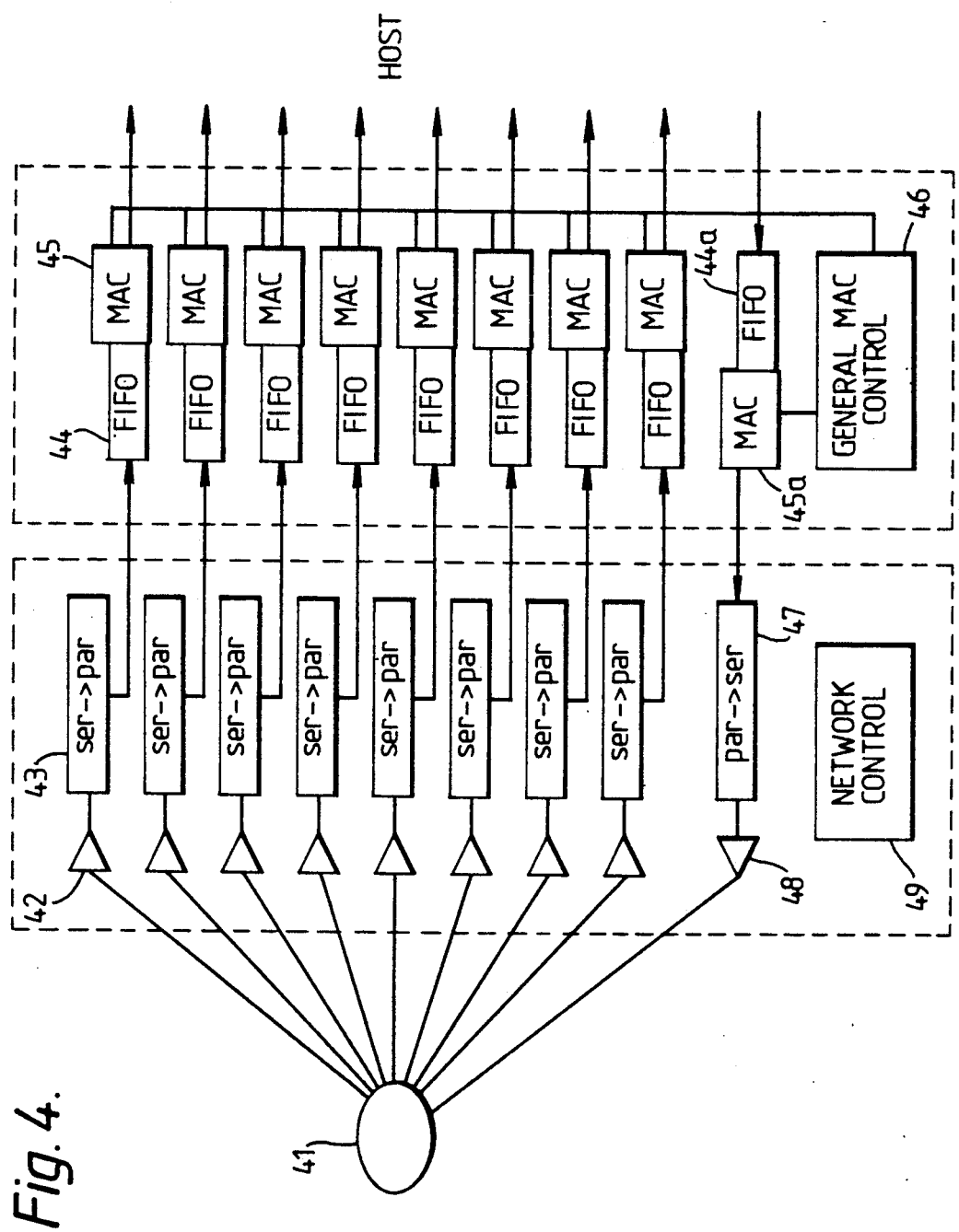

SYNCHRONOUS NETWORK

This invention relates to networks for the transmission of data between a number of nodes or terminals.

BACKGROUND OF THE INVENTION

Network systems for the transmission of data between a plurality of nodes or terminals are of increasing interest in the data processing field. For example, optical systems utilizing fibre optic transmission with various network configurations, employing either active or passive couplers and dividers with both wavelength and time division multiplexing, are being developed at the present time. Uses include broadband overlay for subscriber access networks and ultra-high capacity packet switching for telecommunication or parallel processing computer applications. See for example A. Oliphant "Progress in the development of a digital optical routing system for television studio centres", International Broadcasting Convention IBC 88, Brighton, Sep. 88, IEE Conference Publication No. 293 pp 90-94, D. B. Payne & J. R. Stern "Single mode optical local networks", Conf. Proc. Globecom '83, Houston, paper 39.5 and E. Authurs et al "A fast optical cross connect for parallel processing computers" Proc. 13th European Conference on Optical Communication, Helsinki, Finland, Sep. 1987.

Such systems offer capacities which are orders of magnitude greater than electronic (time multiplexed) networks, complete flexibility of interconnect configuration, service transparency and considerable facility for future upgrades.

In order to make a particular connection between the nodes of such a network the optical receiver in the receiving node must be tuned into the same wavelength as the required transmitter. The switching and reconfiguration of connections in the network can be achieved either by switching the wavelength of transmission with fixed separate wavelength receivers at each node or by using fixed separate wavelength transmitters in each node and switched wavelength receiver.

For high speed reconfiguration of the interconnection pattern such as required by telecoms or computer packet switching applications it is necessary to devise a very rapid communication protocol between the nodes for setting up the required interconnection pattern. This is very much easier to achieve using wavelength switched transmitters and fixed wavelength receivers because in this case the network becomes "self routing" with messages automatically directed by the transmitter to the correct receiver. A good example of such a network is shortly to be published by E. Authurs et al. "HIPASS : an optoelectronic hybrid packet switching system" IEEE Jnl. on selected areas of Communications Dec. 1988. A disadvantage with this type of network is that it requires wavelength switched transmitter components which are very difficult to fabricate with adequate performance. A further disadvantage of conventional networks is the difficulty of providing a broadcast facility in which one node can broadcast a message to all the other nodes. This can introduce severe problems in maintaining the correct time sequence of signals.

The object of the present invention is to minimize or to overcome these disadvantages.

Reference is directed to our co-pending U.S. application Ser. No. 07/432,574 which relates to a multi-wavelength optical network comprising a plurality of nodes interconnected via a single common passive optical coupler wherein all signals transmitted over the network are synchronous at the coupler, each node receiving signals from all the nodes and each node including wavelength demultiplexing means.

SUMMARY OF THE INVENTION

According to one aspect of the invention there is provided a data communications network, comprising a plurality of terminal stations interconnected by communication means, wherein each terminal broadcasts messages via the communications means to all the other terminals including itself, wherein messages are transmitted in a sequence of frames, each frame comprising a plurality of messages one from each of said terminals, the messages within a frame being received concurrently and in parallel, wherein each terminal includes means for ordering received messages into the order of reception of frames and, within each said frame, into a predetermined order.

According to another aspect of the invention there is provided a data communications network, including a plurality of terminal stations each of which is assigned a unique identifying transmission characteristic, and a communications medium interconnecting the terminal stations, wherein data are transmitted via the network in a sequence of frames each frame containing data from one or more said terminals, and wherein, within any one said frame, the effective time order of data signals corresponds to a predetermined order of transmission characteristics

BRIEF DESCRIPTION OF THE DRAWINGS

An embodiment of the invention will now be described with reference to the accompanying drawings in which:

FIG. 4 is a schematic diagram of a system node.

DESCRIPTION OF PREFERRED EMBODIMENT

Figure 1:
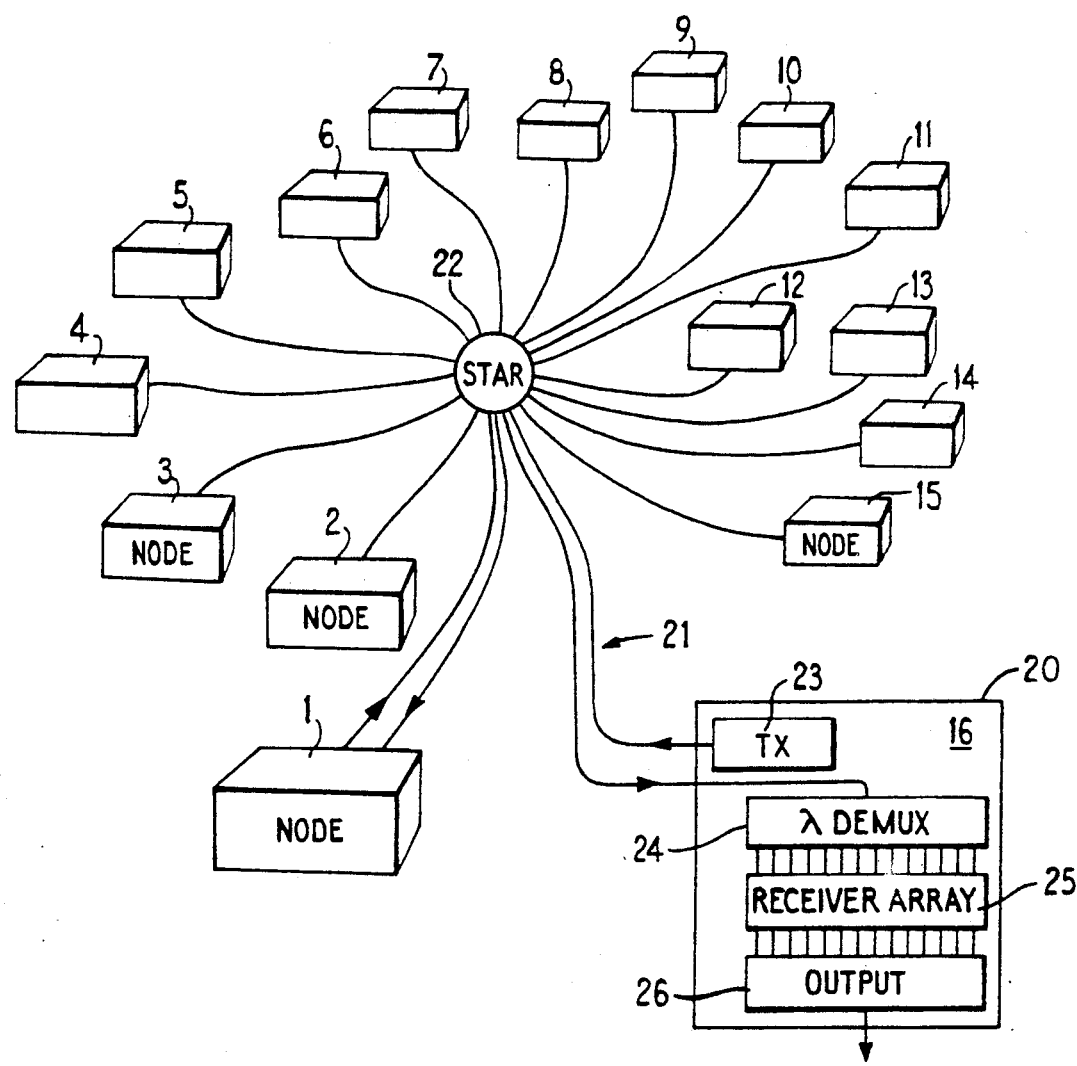
FIG. 1 is a general schematic diagram of a synchronous multi-frequency optical network.

In the network of FIG. 1, a number of identical node equipment 20 are interconnected by optical fibre transmission paths 21 via a common passive optical star coupler 22. The star provides a reference point through which all transmissions are routed. The design of the star coupler is such that there is only a single path from each input to every output. In the example shown there are sixteen nodes, the node illustrated in more detail being number 16. It will however be appreciated that the technique is not restricted to this particular number of nodes. Each node has a single wavelength optical transmitter 23, the wavelength being different for each node 20 of the system. Signals from any one node are propagated via the fibre and star coupler network to all system nodes, including the node which originates the signals.

Each node also includes a wavelength demultiplexer 24 wherein the signals from all the nodes are demultiplexed into sixteen channels and applied via a multi-channel receiver array 25 to an output circuit 26. Typically a wavelength demultiplexer uses a diffraction grating and lens to direct each separate channel wavelength signal to a separate detector.

One system node. e.g. node 1, functions as a reference node, and all other nodes are synchronized with this reference node at the star coupler. To effect this synchronization, each node (except node 1) adjusts its frame transmission timing so that its returning signal is synchronized with that arriving from node 1. This provides automatic compensation for the different propagation delays between each node and the common star coupler.

When the system is turned on, all nodes synchronize their frames with frames from the reference node without regard to phase. The reference node may be determined e.g. by selecting the lowest wavelength present at the time of initial system configuration or by some other mutually agreed method which allows each node to determine the reference node independently. Each terminal or node determines, from the delay between transmission and receipt of its own message, its own distance in frame times from the star or reference point of the network. This information is transmitted by each node to all the other nodes attached to the system. From this received information and from the determination of its distance from the star, each node determines the correct delay to apply to each acknowledgement such that all node acknowledgements for a particular message arrive at the sender in the same frame. I.e. all acknowledgements arrive together at the sending node. In an alternative embodiment, each node may apply a delay sufficient to accommodate a network containing a node on a maximum radius arm. This approach reduces the complexity of the start-up procedure but imposes the maximum acknowledgement delay which could occur in any network on all networks.

Figure 2:
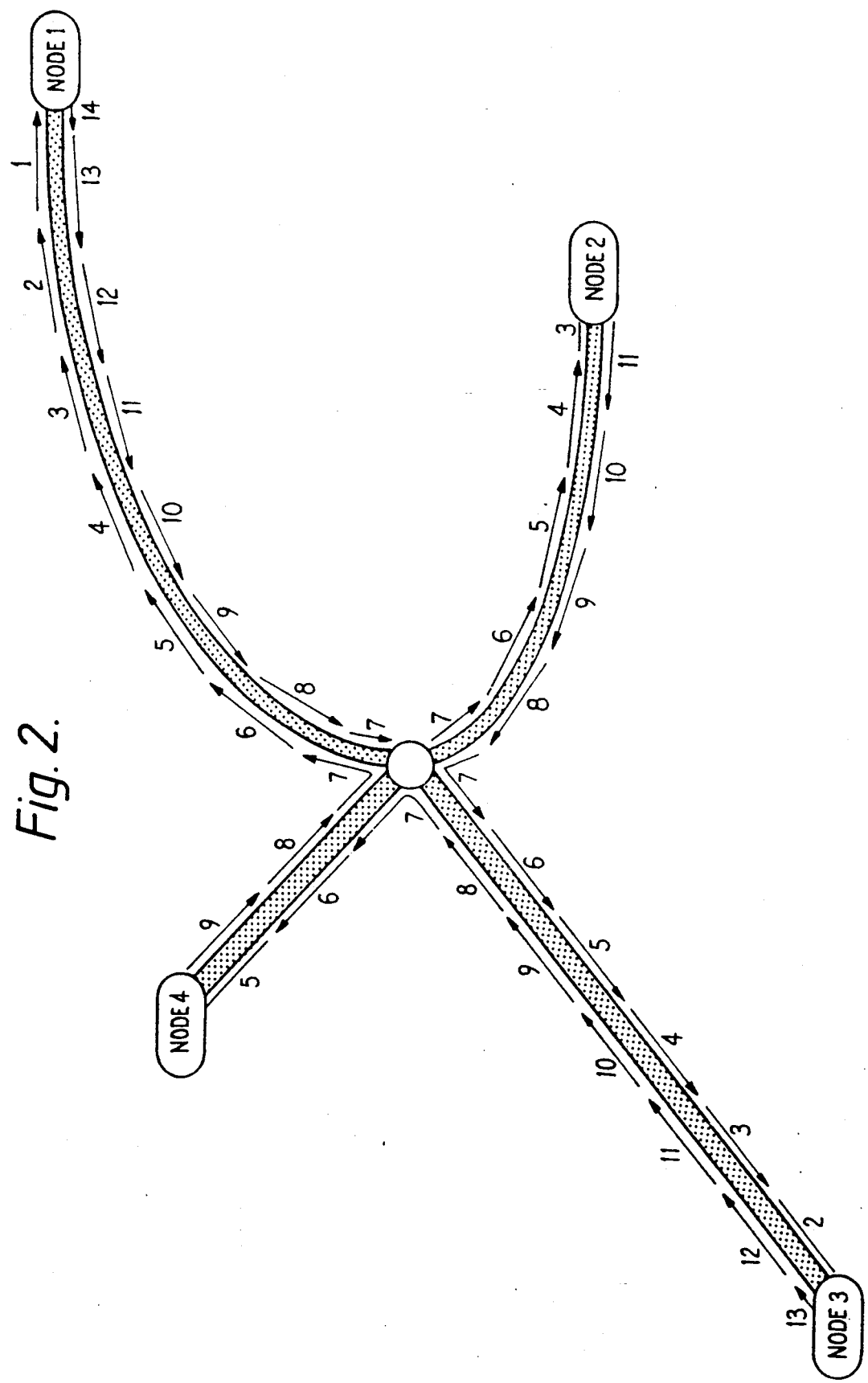
FIG. 2 illustrates the transmission of broadcast frames of information around the network, of FIG. 1.

Each node with a public write to send transmits it on its own optical frequency in the data packet of the work frame. No arbitration or priority resolution is required. The frames are fixed in length and may be short in comparison to the time taken for a frame to transit the network. Typically the frames each comprise 64 bytes and each occupy a time period of 0.5 to 1 microsecond. The transmission format is illustrated in FIG. 2, which, for clarity shows a four terminal network. In FIG. 2 the frames are numbered to indicate their relative timestamp positions. All nodes receive all the data packets from all nodes, including their own.

Figure 3:
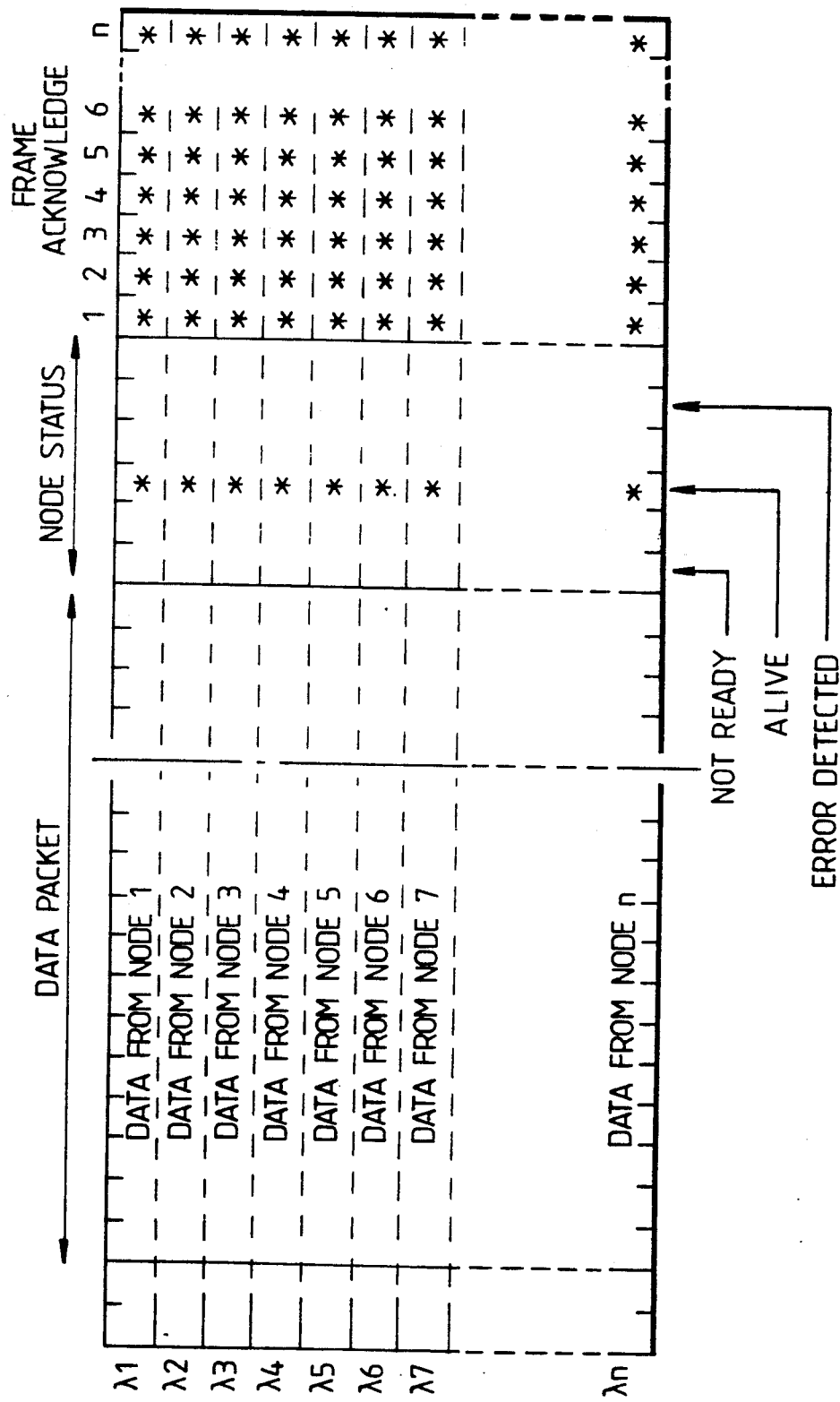
FIG. 3 shows a typical frame format.

The frame format is illustrated in FIG. 3 of the accompanying drawings. As can be seen from FIG. 3, each node writes in data at its own node wavelength $=_n$. Each frame can carry in parallel, data from all the system nodes thus providing efficient use of the system bandwidth. The first column of the frame may contain a timing/supervisory bit.

The received data packets within a frame are treated as having been received in the same order in which the wavelengths are numbered. This is equivalent to resolving timestage order using a number issued by a token circulating the central star in the order of the wavelength numbering, pausing briefly at each node to issue it with a number before incrementing itself and proceeding to the next node. Consequently, each node remains in a fixed time order relative to the other nodes of the network. As the frames are short in comparison to the transit time, a high degree of timestage resolution is provided. In an alternative embodiment, each terminal may prefix its message with a unique code identifying that terminal for time ordering purposes.

Referring now to FIG. 4, each system node includes a wavelength demultiplexor 41, e.g. a diffraction grating, having a plurality of outputs one for each system wavelength. The demultiplexor outputs are coupled each to a corresponding receiver 42 the output of which is fed to a series/parallel converter 43.

The outputs of the series/parallel converters 43 are coupled each to a first-in-first-out (FIFO) store 44. Readout of the FIFO store in the correct sequence within each frame is controlled via memory access circuits 45 by a general control circuit 46. The control circuit 46 also controls transmission of signals from the terminal via a further FIFO store 44a and a further memory access circuit 45a. The transmitter signals are then fed via a parallel/series converter 47 to a transmitter 48 whereby the signal is launched into the network. A network control circuit 49 determines synchronization of the terminal with the network. The system node of FIG. 4 order receivers messages into the order of reception of frames and, within each frame, order messages according to their corresponding wavelength.

The latency experienced by a node waiting to receive its own message back from the centre star, and hence resolve its own time stamp order, is twice the delay imposed by its own arm of the network. The effect of this is that nodes with short links to the centre of the star experience less latency than more distant nodes. This situation is illustrated in FIG. 2 where node 4 experiences the shortest latency and node 1 the longest latency.

The network provides message acknowledgement at the physical level. The acknowledgement of receipt of messages in each node is delayed by a number of frame times sufficient to ensure that the acknowledgment arrives at the centre star at the same time as the undelayed acknowledgment for the same frame from the most distant node. This allows all acknowledgements for a given frame to be received back at the transmitting node simultaneously n frames later.

Each node also transmits status information to assist with rapid error detection and flow control. The exact nature of the status information required has not been determined but may include: not-ready, I am alive, and no-errors-detected.

The network described above is of particular application in the coupling of a plurality of computers or data processors having shared data. It is not however limited to this application and may also, for example, be employed in the interconnection of a number of telephone exchanges for the interchange of informing data.

It will be understood that whilst the technique is of particular advantage for optical networks, it may also be employed in non-optical systems.

I claim:

1. A data communications network, comprising a plurality of terminal stations interconnected by communication means, wherein each terminal broadcasts messages via the communications means to all the other terminals including itself, wherein messages are transmitted in a sequence of frames, each frame comprising a plurality of messages one from each of said terminals, the messages within a frame being received concurrently and in parallel, wherein each terminal includes means for rearranging the received messages into the order of reception of frames and, within each said frame, into a predetermined order.

2. A data communications network comprising a plurality of terminal stations interconnected by a communications medium via a common point or star, wherein each said terminal broadcasts messages to the network in a frame format via the common star, wherein each terminal has means for determining its distance in frame time from the common star and for transmitting information relating to that distance to all the other system terminus, wherein each said terminal has means for transmitting an acknowledgement of a message received from another terminal, and wherein each said terminal has means for determining, from the distance of itself and the other terminals from the common star, the time of each transmitted acknowledgement such that all acknowledgements of one message for any one terminal arrive at that terminal within the same frame.

3. A data communications network comprising a plurality of terminal stations interconnected by a communications medium via a common star, wherein each said terminal broadcasts messages via the common star to all other terminals including itself, wherein messages are transmitted in a sequence of frames, each frame comprising a plurality of messages one for each said terminal, the messages within a frame being received concurrently and in parallel, wherein one terminal provides a frame timing reference for the system, and wherein each said terminal determines, from the frame timing reference of the reference terminal, its time delay from the star and transmits that information to all other system terminals whereby to provide frame synchronization of the network, and wherein each said terminal includes means for rearranging the received messages into the order of reception of frames and, within each frame, into a predetermined order.

4. A network as claimed in claim 3, wherein each said terminal has means for determining its distance or delay time from the common point or star and for transmitting information corresponding to that delay time to all other terminals of the network.

5. A network as claimed in claim 4, wherein each said frame comprises for each frequency within the frame, a data packet, node status information and frame acknowledge information.

6. A network as claimed in claim 5, wherein one said terminal or node functions as a reference node to which the other system nodes are synchronized at the star.

* * * * *